United States Patent
Miller

(10) Patent No.: US 7,249,177 B1
(45) Date of Patent: Jul. 24, 2007

(54) BIOMETRIC AUTHENTICATION OF A CLIENT NETWORK CONNECTION

(75) Inventor: Eric E. Miller, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 601 days.

(21) Appl. No.: 10/306,582

(22) Filed: Nov. 27, 2002

(51) Int. Cl.
*G06F 15/173* (2006.01)

(52) U.S. Cl. .................. 709/225; 709/203; 709/219; 709/229; 709/230; 709/237; 726/3; 726/12; 726/21; 726/28

(58) Field of Classification Search ............. 709/217, 709/225, 229; 713/186; 725/3, 12, 21, 28
See application file for complete search history.

(56) References Cited

U.S. PATENT DOCUMENTS

| | | | |
|---|---|---|---|
| 5,229,764 A | 7/1993 | Matchett et al. | |
| 5,280,527 A * | 1/1994 | Gullman et al. | 713/184 |
| 6,081,900 A * | 6/2000 | Subramaniam et al. | 713/201 |
| 6,131,120 A * | 10/2000 | Reid | 709/225 |
| 6,163,616 A | 12/2000 | Feldman | |
| 6,167,517 A * | 12/2000 | Gilchrist et al. | 713/186 |
| 6,185,316 B1 * | 2/2001 | Buffam | 382/115 |
| 6,189,096 B1 * | 2/2001 | Haverty | 713/155 |
| 6,510,236 B1 * | 1/2003 | Crane et al. | 382/116 |
| 6,615,264 B1 * | 9/2003 | Stoltz et al. | 709/227 |
| 6,651,168 B1 * | 11/2003 | Kao et al. | 713/185 |
| 7,020,705 B2 * | 3/2006 | Wang et al. | 709/229 |
| 7,076,797 B2 * | 7/2006 | Loveland | 726/4 |
| 2002/0035699 A1 * | 3/2002 | Crosbie | 713/201 |
| 2002/0056040 A1 * | 5/2002 | Simms | 713/171 |
| 2002/0104006 A1 * | 8/2002 | Boate et al. | 713/186 |
| 2002/0124190 A1 * | 9/2002 | Siegel et al. | 713/202 |
| 2002/0129285 A1 * | 9/2002 | Kuwata et al. | 713/202 |
| 2002/0147909 A1 * | 10/2002 | Mullen et al. | 713/173 |
| 2003/0051173 A1 * | 3/2003 | Krueger | 713/202 |
| 2003/0172090 A1 * | 9/2003 | Asunmaa et al. | 707/200 |
| 2003/0236982 A1 * | 12/2003 | Hsu | 713/171 |
| 2005/0254652 A1 * | 11/2005 | Engler et al. | 380/270 |

OTHER PUBLICATIONS

Andrew Klosterman, et al. *Secure Continuous Biometric-Enhanced Authentication*, May 2000 CMU-CS-00-134, pp. 1-22.

* cited by examiner

*Primary Examiner*—Michael Y. Won

(57) ABSTRACT

A client is authenticated to a network resource wherein the client is coupled to a biometric sensor. The client signals a request to the network resource (e.g., by connecting to an access point). The network resource initiates a point-to-point LAN authentication protocol between the network resource and the client. The network resource requests biometric data from the client via the LAN authentication protocol (optionally either before or after authenticating with other credentials). The client captures biometric data of an attendant user of the client. The client transmits the captured biometric data to the network resource via the LAN authentication protocol. The network resource encapsulates the biometric data in the LAN authentication protocol into an authentication server protocol and forwards the encapsulated biometric data to an authentication server. The authentication server compares the biometric data to a biometric template stored in conjunction with the authentication server for making a determination whether the attendant user should be granted access to the network resource. The authentication server sends either an access-accept message or an access-deny message in the authentication server protocol to the network resource in response to the determination. The network resource grants access to the client only after receiving an access-accept message.

21 Claims, 6 Drawing Sheets

BIOMETRIC AUTHENTICATION OF A CLIENT NETWORK CONNECTION

CROSS REFERENCE TO RELATED APPLICATIONS

The present application is related to U.S. application Ser. No. 10/307,110, entitled "Continuous Biometric Authentication Using Frame Preamble for Biometric Data," filed concurrently herewith.

STATEMENT REGARDING FEDERALLY SPONSORED RESEARCH

Not Applicable.

BACKGROUND OF THE INVENTION

The present invention relates in general to security of a computer network, and, more specifically, to a computer network security system for preventing unauthorized access to network resources using biometrics.

Biometric authentication involves the use of physical and/or behavioral characteristics of individuals to identify them and to control access to places or things, such as ATM's or other computerized equipment, or more specifically, applications running on that equipment. Biometrics has certain advantages over conventional authentication techniques (e.g., user IDs and passwords, PIN codes, and encoded identification cards) since there is nothing to remember or to carry which might be stolen. Among the many biometric technologies in use are fingerprint analysis, hand geometry analysis, retina scanning, iris scanning, signature analysis, facial recognition, keystroke analysis, and voice analysis.

Based on an original measurement of a biometric characteristic (i.e., enrollment), a person's identity can thereafter be verified automatically when requesting access to a computer application or other resource by re-sampling the characteristic and comparing the biometric data with the enrollment data. If a sufficiently close match is found, then the identity is verified. In addition to verification of an identity, biometric systems can also be employed to compare biometric data from an unidentified person with a database of biometric samples of a group of individuals in order to potentially identify that person from the group.

After a biometric sensor acquires raw data of a desired characteristic, the data is typically processed mathematically in order to extract and format the meaningful features and to compress the data. Comparison of the processed verification or identification data with previously processed and stored enrollment data typically involves a mathematical analysis to quantify the "closeness" of the two data samples. A sensitivity threshold is chosen to delineate how close the samples must be in order to call them a match.

Biometric authentication systems have been specifically adapted to provide a secure interface to computer software applications and their data. The biometric security packages have concentrated on controlling access to the software applications because the protection of applications and their data is a primary focus for owners of sensitive information. In the computing environments of most business environments (and increasingly in residential situations), computing resources are connected within networks, such as local area networks (LANs) and wide area networks (WANs). Existing biometric security packages can be used in a network environment for controlling access to the protected software applications from other points in the network.

With the advancement of computer networking hardware and operating system support for networking, it has become easy to connect a computer to a network and configure it for use within the network. In particular, the use of wireless access points in a network provide opportunities for unauthorized access into a network (e.g., a LAN) when the coverage area of the wireless access point includes public areas. In addition, hardwired LAN connections in corporate Intranets are sometimes available in loosely controlled areas of company facilities such as conference rooms, visitors offices, and vacant offices. Although applications residing on the network may be protected by various security measures (including biometrics), it is difficult to ensure that there are no unprotected areas within a particular network that could be exploited by an unauthorized user.

SUMMARY OF THE INVENTION

Among the advantages of the present invention is the ability to secure a network resource connection itself (e.g., to an Ethernet switch or a wireless access point) so that no network activities involving the network resource other than the authentication activities (e.g., biometric authentication) of the present invention may be conducted from the access point. Authentication functions are distributed within a network to provide scalability and lower overall costs for a security system which may combine biometric authentication with the use of other credentials such as digital certificates and usernames and passwords.

In one aspect of the invention, a method is provided for authenticating a client to a network resource wherein the client is coupled to a biometric sensor. The client signals a request to the network resource (e.g., by connecting to an access point). The network resource initiates a point-to-point LAN authentication protocol between the network resource and the client. The network resource requests biometric data from the client via the LAN authentication protocol (optionally either before or after authenticating with other credentials). The client captures biometric data of an attendant user of the client. The client transmits the captured biometric data to the network resource via the LAN authentication protocol. The network resource encapsulates the biometric data in the LAN authentication protocol into an authentication server protocol and forwards the encapsulated biometric data to an authentication server. The authentication server compares the biometric data to a biometric template stored in conjunction with the authentication server for making a determination whether the attendant user should be granted access to the network resource. The authentication server sends either an access-accept message or an access-deny message in the authentication server protocol to the network resource in response to the determination. The network resource grants access to the client only after receiving an access-accept message.

BRIEF DESCRIPTION OF THE DRAWINGS

FIG. 6 is a block diagram of an alternative embodiment using a biometric single sign-on.

DETAILED DESCRIPTION OF PREFERRED EMBODIMENTS

Figure 1:
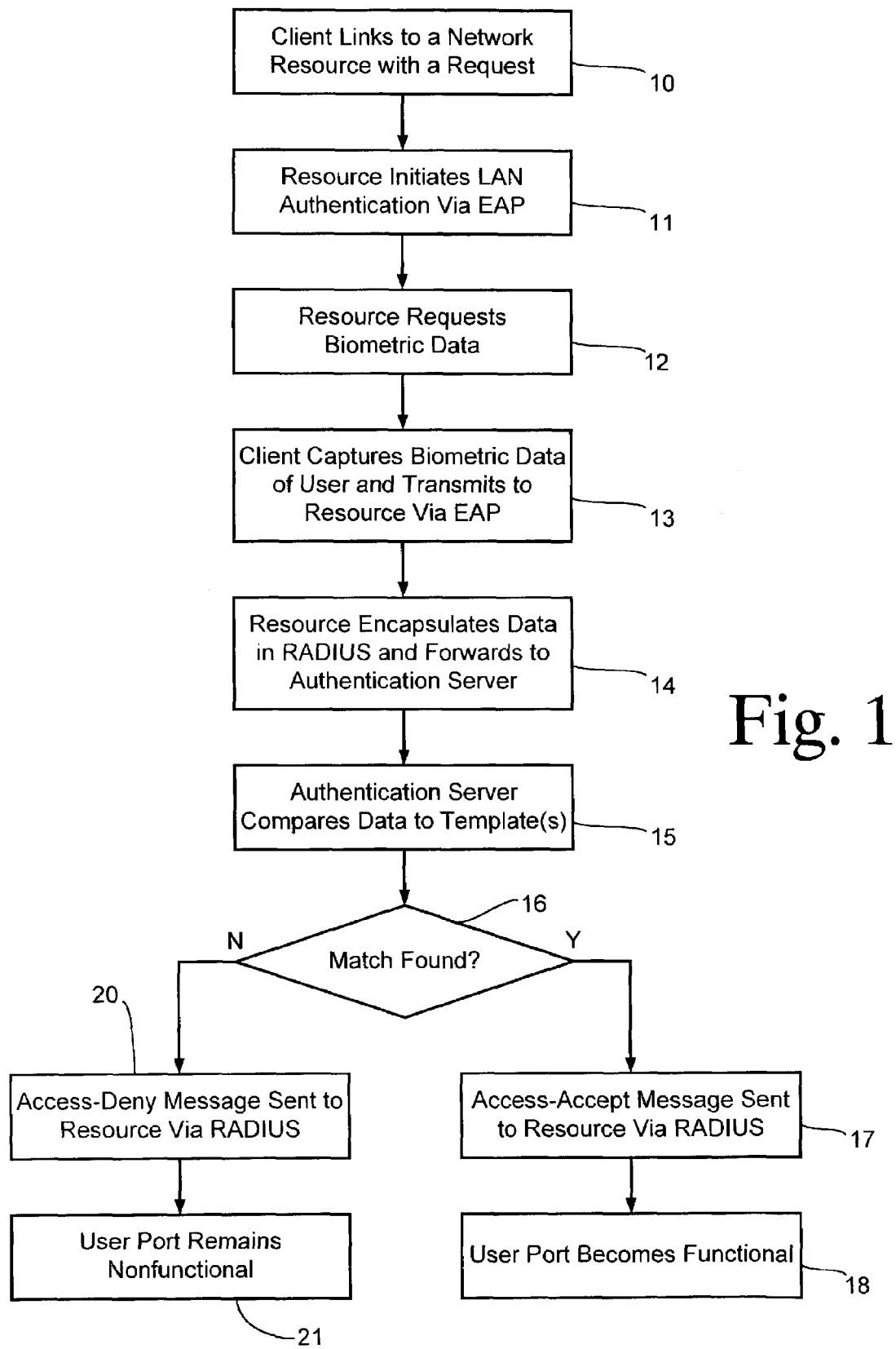
FIG. 1 is a flowchart showing one preferred method of the present invention.

Referring to FIG. 1, a preferred method begins in step 10 when a client links into a network resource and issues a request for access. For example, a laptop computer is connected to an Ethernet cable connected at the other end to an Ethernet switch within a LAN, or a laptop with a wireless interface moves into the coverage area of a wireless access point with the LAN. Thus, the network resource which the client desires to use may be the switch or access point themselves which act as a gateway to the other resources within the LAN. The attendant user (i.e., person) of the client (e.g., laptop) attempts an interaction with the LAN which results in a request message to the LAN such as a DHCP request or a request for a connection with some other resource. In response to the physical or wireless link, the resource acting as an authenticator initiates point-to-point LAN authentication of the client using extensible authentication protocol (EAP) in step 11.

In step 12, the resource/authenticator requests biometric data from the client via an EAP message. The client captures biometric sample data of the attendant user in step 13 and transmits the data to the resource/authenticator via another EAP message. In order to avoid the need for extensive computing capabilities for authentication functions to be resident in the resource (e.g., switch or wireless access point), these functions are preferably performed remotely. Thus, the resource encapsulates the biometric data into messages within a remote authentication dial-in user service (RADIUS) protocol and forwards them to an authentication server in step 14. In step 15, the authentication server initiates the actual comparison of the biometric data with previously acquired and stored biometric templates of authorized users.

In step 16, a determination is made whether a biometric match is found which would indicate that the user should be granted access to the desired resource. If such a match is found, then an ACCESS-ACCEPT message is sent to the resource/authenticator via the RADIUS protocol in step 17. The client is granted access to the desired network resource in step 18 such that the user port (e.g., a physical port on a LAN switch or a virtual or logical port on a wireless access point) becomes functional for exchanging network messages other than the authentication messages.

If no match is found in step 16, then an ACCESS-DENY message is sent to the resource in step 20 and the user port remains nonfunctional in step 21 for any network traffic other than authentication messages.

Figure 2:
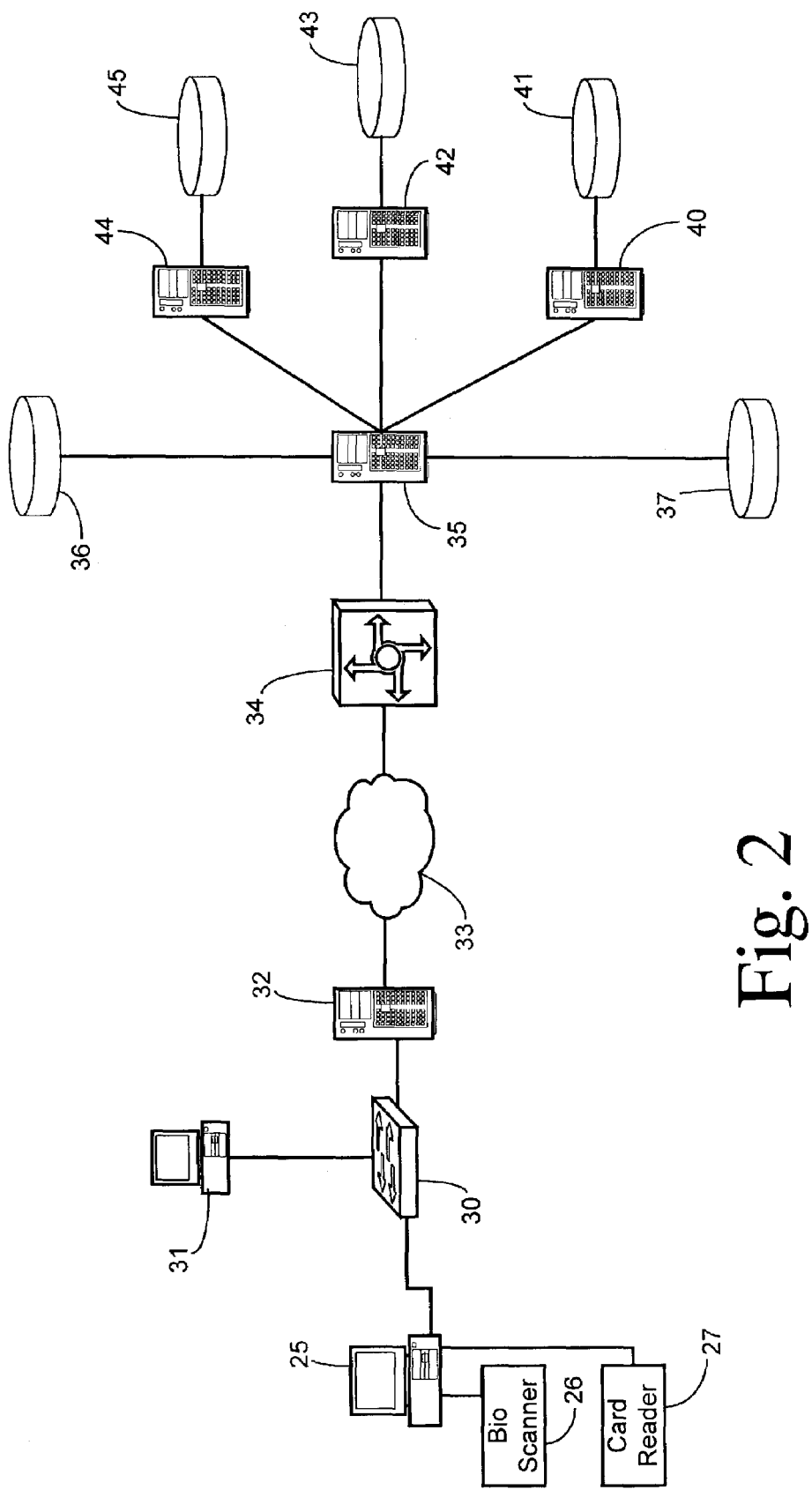
FIG. 2 is a block diagram showing one preferred embodiment of a network architecture of the present invention.

A preferred network architecture of the present invention is shown in FIG. 2. A client computer 25 (i.e., a supplicant) is interconnected with authentication devices including a biometric scanner 26 (such as a video image sensor or a fingerprint sensor) and a card reader 27 (e.g., for reading a portable magnetic card storing a personal digital public-key certificate of a user). Computer 25 is also connected with a LAN switch or wireless access point referred to herein as an authenticator 30. Authenticator 30 may be configured with company, network group, proxy, and other settings from a network management workstation 31.

Authenticator 30 is connected within its LAN with a local proxy RADIUS server 32 which is interfaced to an internetwork 33 such as the Internet. In a remote network (e.g. a back-end network), a layer-4 access switch 34 couples an authentication server/router 35 to internetwork 33. Authentication server 35 is connected with an authentication routing information database 36 and an accounting database 37. Routing information is used during the authentication of a client to direct different types of authentication credentials or data to corresponding verification servers including a biometric verification server 40, a password verification server 42, and a certificate verification server 44. The services of authentication server 35 may be provided on a pay-per-use basis. Usage may be recorded in accounting database 37 so that a service provider can obtain compensation for usage. Messages between authentication server 35 and the other components of the back-end network may preferably be secured using the IPSEC protocol.

Biometric templates of authorized users are stored in a biometric template database 41 connected to biometric verification server 40. Usernames and passwords (e.g., MD5 passwords) of authorized users are stored in a username/password database 43 connected to password server 42. Digital certificates of authorized users are stored in a certificate database 45 connected to certificate server 44.

Figure 3:
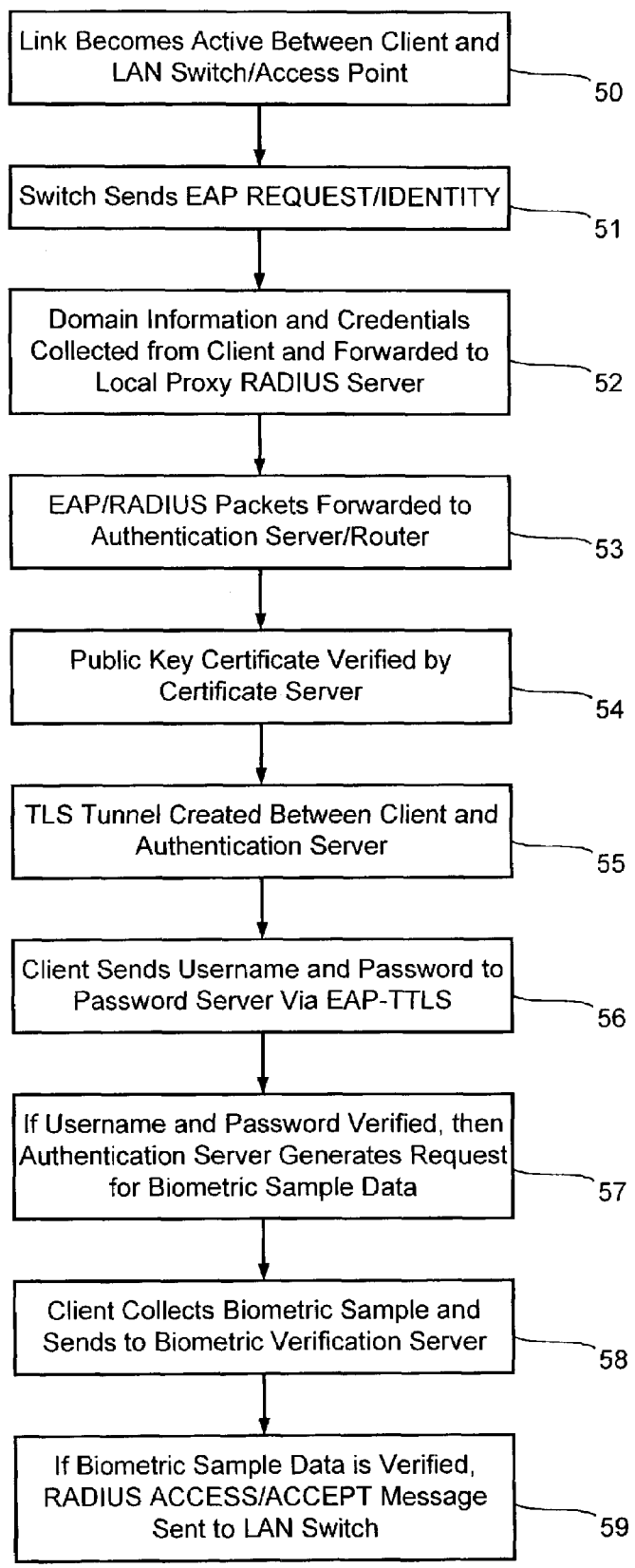
FIG. 3 is a flowchart of a more detailed method used with the network architecture of FIG. 2.

Authentication using the network architecture of FIG. 2 is accomplished using a preferred method shown in FIG. 3. In step 50, a link between the client computer and the authenticator LAN switch or wireless access point becomes active. In step 51, the authenticator sends an EAP REQUEST/IDENTITY message to the client. In the presently described embodiment, authentication using non-biometric credentials precedes a biometric authentication since the biometric authentication may take a relatively greater length of time and use more processing resources than checking a username and password or a digital certificate.

In step 52, company, group, and authentication domain information is collected from the client and/or management workstation, if necessary. This information is put into EAP message packets and encapsulated by the authenticator using RADIUS before being forwarded to the local proxy RADIUS server. These packets and subsequent RADIUS-encapsulated EAP packets are forwarded to the back-end authentication server via the Internet in step 53 (assuming the authentication server recognizes the company and group as one for which is possess authentication information).

In step 54, a digital public-key certificate of the user is verified by the certificate server. Specifically, the authentication server may issue a request for certificate data which is relayed to the client computer using a RADIUS-encapsulated EAP message (which is stripped down to an EAP message by the authenticator and forwarded to the client computer). The client computer collects the user's certificate (e.g., using the card reader) and the data is sent back to the authentication server using EAP and RADIUS.

If the certificate is valid, then a secure Transport Layer Security (TLS) tunnel is created in step 55 between the client computer and the authentication server using EAP and tunneled TLS (EAP-TTLS) which is already used with 802.11 wireless access points. In step 56, the client computer sends a username and password to the password server via the EAP-TTLS tunnel (e.g., in response to a username/password request from the authentication server). The username and password may be input by the user via a keyboard connected to the client computer, for example.

If the username and password are verified, then the authentication server generates a request sent via the EAP- TTLS tunnel to the client for biometric sample data of the attendant user in step 57. In step 58, the client collects a biometric sample and sends the data to the biometric verification server via the authentication server. Since the already verified certificate and username/password signify a claimed identity of the user, a single biometric template corresponding to the claimed identity can be identified and used in a biometric comparison. Unless the biometric sample data matches this single template, an ACCESS-DENY message is sent to the authenticator. In an alternative embodiment, a biometric identification may be conducted alone or prior to other types of identification so that no claimed identity is signified by the user. Instead, a biometric sample is compared with a group of biometric templates for a plurality of authorized users in an attempt to determine the identity of the user and to grant access to the desired network resources if a match is found.

In step 59, if a biometric sample is verified by the biometric verification server, then a RADIUS ACCESS/ACCEPT message is sent to the authenticator and the client/user is granted access to the LAN by enabling non-authentication traffic to pass through the port to which the client is connected.

The embodiment of FIGS. 2 and 3 demonstrates an advantageous security system employing multiple authentication factors or credentials in a network architecture providing efficient use of resources in a scalable manner. By separating authentication verification services from authentication transport services, verification services can be consolidated in a cost effective and highly secure manner. In addition, existing hardware devices may be incorporated into the transport services since support for only existing, nonproprietary protocols (e.g., EAP and RADIUS) is needed.

Figure 4:
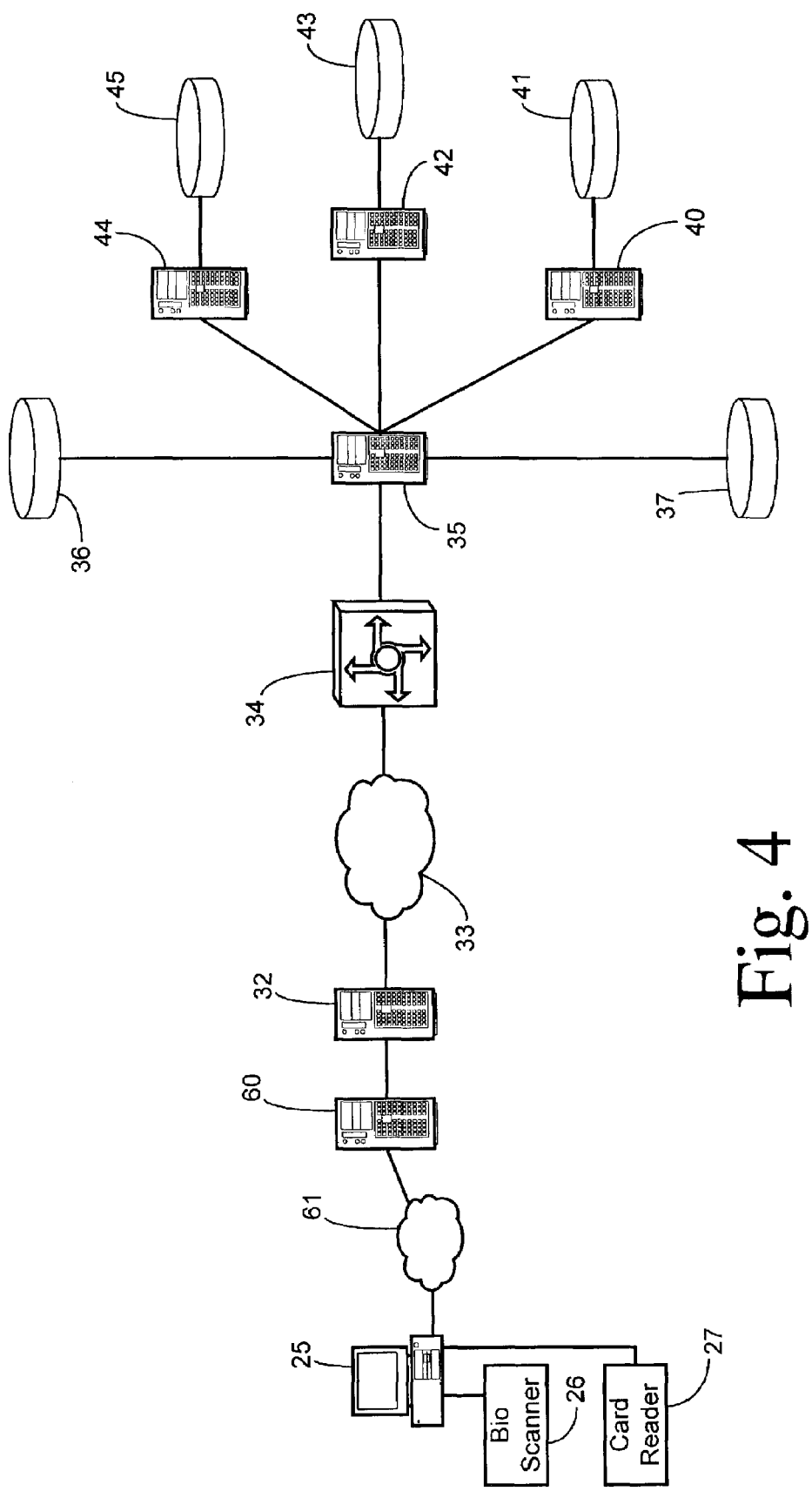
FIG. 4 is a block diagram of an alternative embodiment wherein the protected network resource is comprised of a web client.

While FIGS. 2 and 3 show LAN (i.e., port-based) authentication, the present invention is also adaptable to authentication of a WAN client to a web server or a networked application, for example. As shown in FIG. 4, the authenticator in this embodiment is a web server or networked application 60 which is accessed by client computer 25 via a WAN 61. Authentication begins when client 25 initiates an HTTP session to web server 60. Web server 60 responds with an authentication applet and then with an EAP REQUEST/IDENTITY message encapsulated by HTTP. The applet collects company, group, and authentication domain information which is forwarded by server 60 to local proxy server 32 as EAP packets encapsulated in RADIUS. Similar to the previous embodiment, a digital public-key certificate may be verified and then an EAP-TTLS tunnel created between the client and the authentication server. Subsequent biometric and username/password verifications may be performed in the same manner as shown in FIGS. 2 and 3. If all credentials (biometric and non-biometric) are verified, then a RADIUS ACCESS/ACCEPT (i.e., EAP SUCCESS) message is sent to web server 60 by authentication server 35 and the client is granted access to the web site, services, or networked application.

Figure 5:
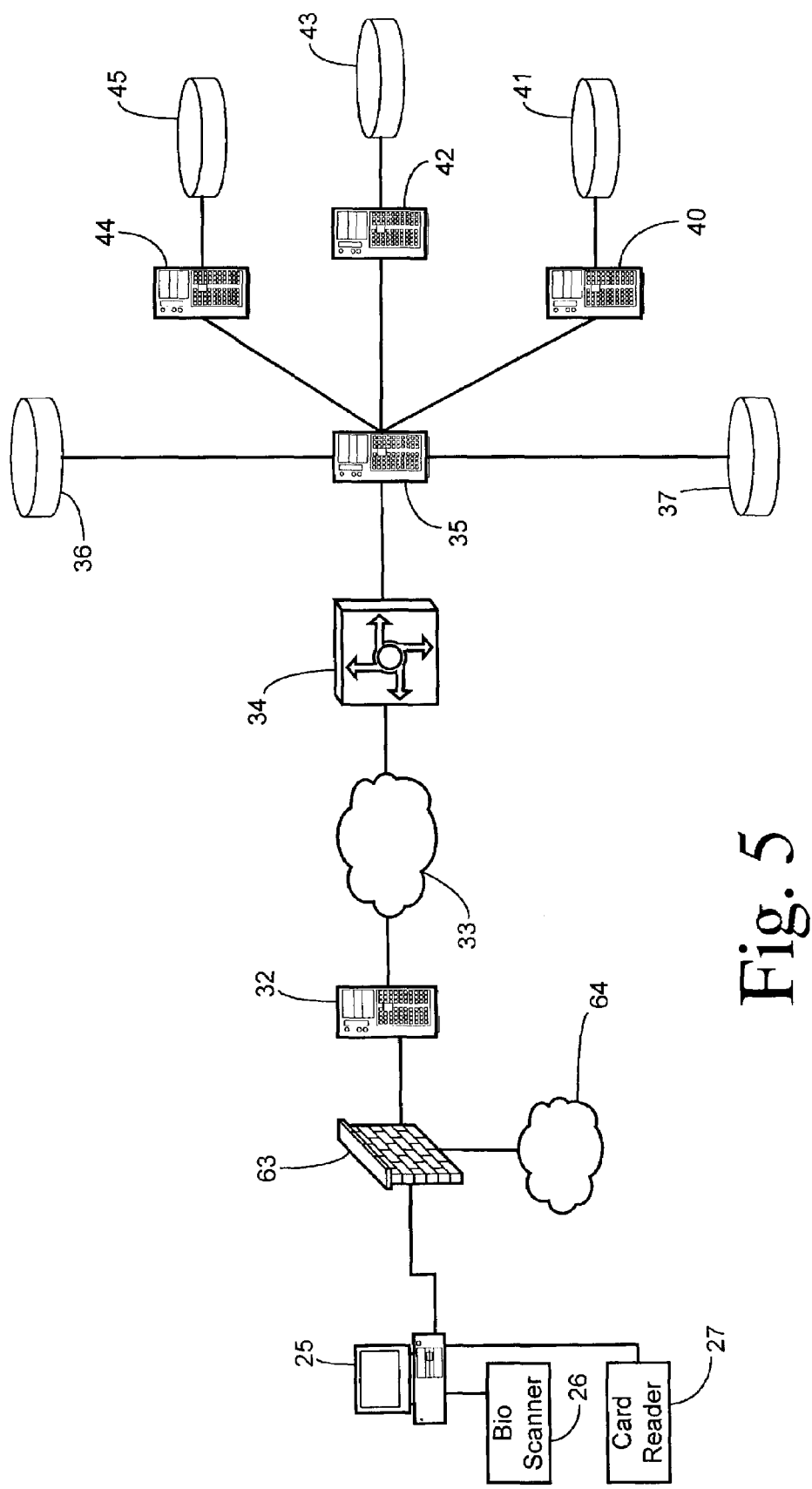
FIG. 5 is a block diagram of an alternative embodiment wherein the protected network resource is comprised of a firewall client.

In yet another embodiment, the present invention is used to control access of a firewall client to a protected network or network area (whether the client is accessing from within a LAN or a WAN). As shown in FIG. 5, a firewall 63 has network connections to client computer 25, local proxy server 32, and a protected network 64. In this embodiment, client 25 initiates an HTTP session to firewall 63. If not already authenticated, firewall 63 sends an authentication applet to client 25 and then an EAP REQUEST/IDENTITY message encapsulated by HTTP. The applet collects company, group, and authentication domain information which is forwarded by server 60 to local proxy server 32 as EAP packets encapsulated in RADIUS. Similar to the previous embodiments, a digital public-key certificate may be verified and then an EAP-TTLS tunnel created between the client and the authentication server. Subsequent biometric and username/password verifications may be performed in the same manner as shown in FIGS. 2 and 3. If all credentials (biometric and non-biometric) are verified, then a RADIUS ACCESS/ACCEPT (i.e., EAP SUCCESS) message is sent to firewall 63 by authentication server 35 and the client is granted access to the protected network.

Figure 6:
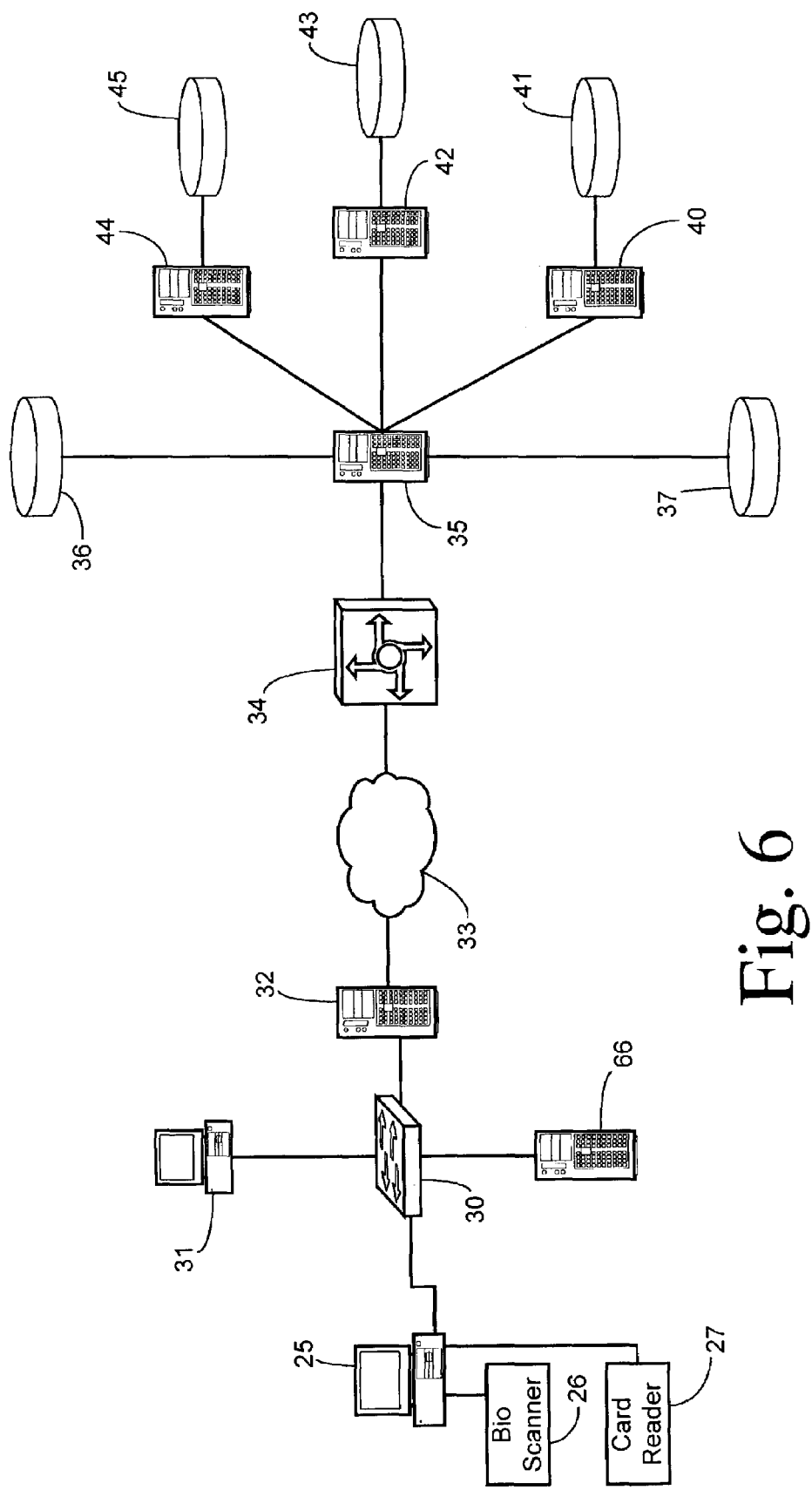

The present invention may also be adapted to provide a biometric single sign-on as shown in FIG. 6 by including a Windows domain controller 66 coupled to LAN switch/wireless access point authenticator 30. In this embodiment, the user is preferably prompted to enter security credentials (e.g., entering username and password, swiping a smart card for identifying a digital certificate, or collecting a biometric data sample) during a Windows login when client computer 25 is booted up. Subsequently, when access to or through the authenticator is attempted then authentication is performed as described with reference to FIGS. 2 and 3. Once a RADIUS ACCESS/ACCEPT message is sent to authenticator 30, the LAN port becomes functional so that the cached security credentials can be used to authenticate to Windows domain controller 66 without a separate sign-on. Windows domain controller can separately authenticate the client using the authentication server using EAP/RADIUS as already described. Thus, a single sign-on is possible for both the client computer and network resources.

Local proxy server 32 can also contain a confidential cache of credentials (certificates, passwords, and/or biometric templates) that may be obtained from authentication server 35 to speed up re-authentication, if desired.

The present invention can be used to provide roaming access to hot-spot wireless LANs, for example. In addition, it can be used for roaming access to a LAN installed in a hotel and to then obtain WAN authentication to access remote network resources in a secure manner. Numerous other applications of the invention will occur to those skilled in the art.

What is claimed is:

1. A method of authenticating a connection for a client to a network access device wherein said client is coupled to a biometric sensor, said method comprising the steps of:

said client signaling a request to said network access device;

said network access device initiating a point-to-point LAN authentication protocol between said network access device and said client, wherein said point-to-point LAN authentication protocol is comprised of extensible authentication protocol (EAP);

said network access device requesting biometric data from said client via said LAN authentication protocol;

said client capturing biometric data of an attendant user of said client;

said client transmitting said captured biometric data to said network access device via said LAN authentication protocol;

said network access device encapsulating said biometric data in said LAN authentication protocol into an authentication server protocol and forwarding said encapsulated biometric data to an authentication server, wherein said authentication server protocol is comprised of remote authentication dial-in user service (RADIUS);

said authentication server comparing said biometric data to a biometric template stored in conjunction with said authentication server for making a determination whether said attendant user should be granted access to said network access device;

said authentication server sending either an access-accept message or an access-deny message in said authentication server protocol to said network access device in response to said determination; and said network access device granting access to said client only after receiving an access-accept message.

2. The method of claim 1 wherein said network access device is comprised of a port on a LAN switch.

3. The method of claim 2 wherein said client and said LAN switch communicate via wireless transmissions and wherein said port is comprised of a logical port.

4. The method of claim 2 wherein said client is coupled to said LAN switch via a cable and wherein said port is comprised of a physical port.

5. The method of claim 1 wherein said network access device is comprised of a server application.

6. The method of claim 5 wherein said point-to-point LAN authentication protocol between said client and said server application is encapsulated in HTTP.

7. The method of claim 1 wherein said network access device is comprised of a firewall.

8. The method of claim 7 wherein said point-to-point LAN authentication protocol between said firewall and said client is encapsulated in HTTP.

9. The method of claim 1 further comprising the steps of:
said attendant user signifying a claimed identity; and
said authentication server selecting a biometric template corresponding to said claimed identity to use in said comparison.

10. The method of claim 1 wherein said biometric comparison is comprised of:
selecting a group of biometric templates corresponding to authorized users of said network access device;
comparing said biometric data to individual templates in said group;
if a match is found then ceasing further comparisons and making a determination that said attendant user should be granted access; and
if no match is found after comparing to all said templates in said group then making a determination that said attendant user should not be granted access.

11. The method of claim 1 wherein said biometric data is comprised of video image data.

12. The method of claim 1 wherein said authentication server is comprised of a local proxy RADIUS server and a remote RADIUS authentication server, and wherein said local proxy RADIUS server collects said biometric data and forwards it to said remote RADIUS authentication server for said comparison.

13. The method of claim 12 wherein said remote RADIUS authentication server forwards a biometric template to said local proxy RADIUS server for storing in a cache, and wherein said local proxy RADIUS server checks said cache for a corresponding biometric template prior to forwarding biometric data to said remote RADIUS authentication server.

14. The method of claim 1 wherein said authentication further includes a non-biometric authentication credential, and said method further comprises the steps of:
said client collecting credential data from said attendant user;
said client transmitting said credential data to said authentication server via said network access device;
said authentication server comparing said credential data to user data from a user database; and
generating said access-accept message only if both said biometric data and said credential data indicate that said attendant user should be granted access to said network access device.

15. The method of claim 14 wherein said non-biometric authentication credential is comprised of a user ID and password.

16. The method of claim 14 wherein said non-biometric authentication credential is comprised of a digital certificate.

17. The method of claim 14 wherein said credential data is collected during a single sign-on during initialization of said client.

18. A network architecture for authenticating a client using biometrics, comprising:
an authenticator located in a local area network (LAN) at an access point interfacing said client to desired network resources, said authenticator exchanging authentication messages with said client via a LAN authentication protocol, wherein an EAP protocol is used to transmit authentication messages between said client and said authenticator, said authentication messages including biometric data of an attendant user of said client, wherein network communication between said authenticator and said client is limited to said authentication messages until said authenticator receives an access-accept message;
an authentication server located remotely from said LAN for processing authentication messages;
a local proxy server located in said LAN for relaying authentication messages between said authenticator and said authentication server;
a biometric verification server coupled to said authentication server for comparing said biometric data with biometric templates in a biometric template database of authorized users to determine whether said attendant user should be granted access to said desired network resources;
wherein said authentication server sends said access-accept message to said authenticator if said biometric verification server determines that said attendant user should be granted access; and
wherein a RADIUS protocol is used to relay authentication messages between said authenticator, said local proxy server, and said authentication server.

19. The network architecture of claim 18 further comprising:
a certificate server coupled to said authentication server for comparing a digital certificate provided by said client via said authentication messages with a certificate database of authorized users to determine whether said attendant user should be granted access to said desired network resources;
wherein said authentication server sends said access-accept message to said authenticator only if both said biometric verification server and said certificate server determine that said attendant user should be granted access.

20. The network architecture of claim 18 further comprising:
a password server coupled to said authentication server for comparing a username and password provided by said client via said authentication messages with a password database of authorized users to determine whether said attendant user should be granted access to said desired network resources;

wherein said authentication server sends said access-accept message to said authenticator only if both said biometric verification server and said password server determine that said attendant user should be granted access.

21. The network architecture of claim 19 further comprising:

a password server coupled to said authentication server for comparing a username and password provided by said client via said authentication messages with a password database of authorized users to determine whether said attendant user should be granted access to said desired network resources;

wherein said authentication server sends said access-accept message to said authenticator only if all three of said biometric verification server, said certificate server, and said password server determine that said attendant user should be granted access.

* * * * *